(No Model.)

D. M. BLACK.
AUTOMATIC CHEESE PROTECTOR.

No. 488,598. Patented Dec. 27, 1892.

WITNESSES:
H. B. Bradshaw
J. H. Frazel

INVENTOR
David M. Black,
BY
Staley and Shepherd
ATTORNEYS.

UNITED STATES PATENT OFFICE.

DAVID M. BLACK, OF NEWARK, OHIO.

AUTOMATIC CHEESE-PROTECTOR.

SPECIFICATION forming part of Letters Patent No. 488,598, dated December 27, 1892.

Application filed June 23, 1892. Serial No. 437,784. (No model.)

*To all whom it may concern:*

Be it known that I, DAVID M. BLACK, a citizen of the United States, residing at Newark, in the county of Licking and State of Ohio, have invented a certain new and useful Improvement in Automatic Cheese-Protectors, of which the following is a specification.

My invention relates to the improvement of automatic cheese protectors and the objects of my invention are, to provide a simple, reliable and effective device adapted to protect the cut surfaces of a cheese against the action of the atmosphere and to preserve the same in its normal condition; to provide in my improved cheese protector a means for supporting the cheese in its normal shape, and to produce other improvements which will be more specifically pointed out hereinafter. These objects I accomplish in the manner illustrated in the accompanying drawings, in which—

Figure 1:
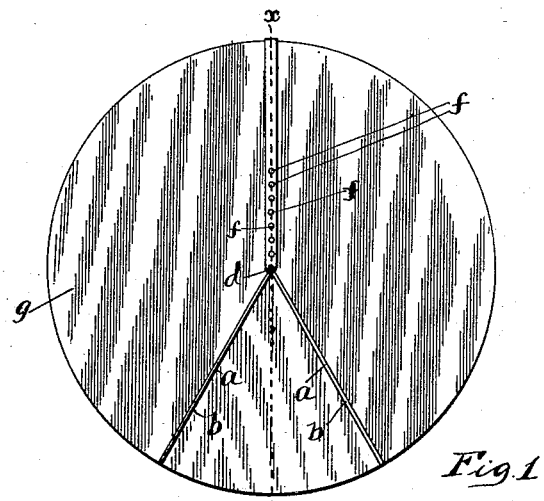
Figure 2:
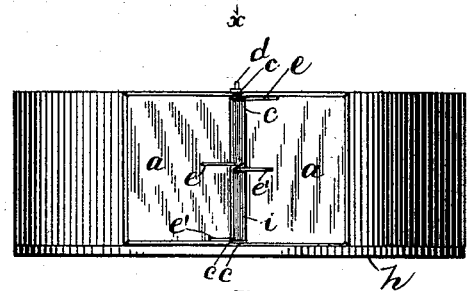
Figure 3:
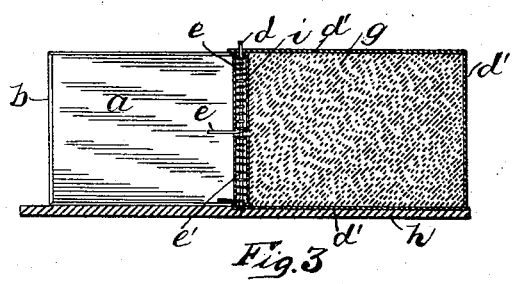

Figure 1 is a plan view of a cheese having a segment cut therefrom and having my improved protector connected therewith. Fig. 2 is a view in elevation of the same and Fig. 3 is a central longitudinal section on line $x\,x$ of Fig. 1.

Similar letters refer to similar parts throughout the several views.

As shown in the drawings, the body of my improved protector consists of two metallic plates indicated at $a\,a$, said plates preferably conforming in height with the height of the cheese with which the same are to be used and being of a length substantially equal to the distance from the center to the periphery of the cheese. As indicated at $b$, the edges of these plates are thickened or strengthened preferably by being doubled. I may however, cause said doubled or over-lapping edges to incase a wire. As shown in the drawings, the upper and lower edge portions of the plates are continued past the rear edges of the plates forming short arms $c$. The arms $c$ of one of the plates $a$ have rigidly connected therewith a vertical spring pin or post $d$, said connection being formed in the upper and lower portions of said pin, while the arms $c$ of the remaining plate have their extremities loosely encircling or pivotally connected with said pin $d$.

$e\,e'$ represent coiled springs which as shown in the drawings, are wound upon the pin $d$ in the upper and lower half thereof, respectively. The upper end of the upper spring $e$, is as shown bent outward and secured to one of the plates $a$ adjoining the upper edge thereof, while the lower end of the lower spring $e$ is similarly bent and secured to the remaining plate $a$. The inner ends of the springs $e\,e'$ are as shown in the drawings bent in opposite directions and are secured respectively to the faces of the plates $a\,a$. The lower end of the pin $d$ is as shown in the drawings preferably pointed. To this lower end portion of the pin $d$ is secured a binding strip $d'$ which although being preferably formed of metal may be produced of any desirable flexible material. This binding strip has formed therein in its outer portion a number of pin-holes indicated at $f$, which are adapted as hereinafter described to receive the upper projecting end of the pin $d$.

The method of utilizing my improved cheese protector is substantially as follows: A segment or cut of cheese being removed from the circular cheese indicated at $g$, a spring or hinge pin $d$ is supported vertically at the point of the angle cut or at the center of the cheese and the spring actuated plates $a$ allowed to press against the cut faces of the cheese. The protector is supported in this position by means of the binding strip $d'$ which as shown in the drawings, may be passed beneath that half of the cheese which is opposite the cut, brought upward against the side thereof and thence over the top of the cheese body to the upper end of the pin $d$, the latter being made to engage with one of the pin-holes $f$. The protector may be further secured in its position by causing its pointed lower end to be inserted in the usual cheese supporting disk or box-bottom which is indicated at $h$.

From the construction herein shown and described, it will be seen that under the influence of the coiled springs and the engagement therewith of the ends of said springs, the plates or wings $a\,a$ will be kept constantly pressed against the vertical cut faces of the cheese and as cuts are gradually formed from the center to the periphery of the cheese, said springs will serve to cause the plates to follow the cut faces until the cheese is entirely consumed. It is evident from this construction and operation that the cut faces of the cheese will not be exposed to atmospheric influences and that the cheese will thus be kept moist and in condition for use. It will also be observed that the plates $a$ will serve by pressure to prevent any tendency of the cheese toward settling or falling and that the same will thus be retained in its normal shape.

As shown in the drawings, I preferably employ a suitable casing $i$ about the springs $e\ e'$ which may be in any desired number of sections.

It is evident that a cheese protector of the character herein shown and described may be readily produced in a simple, and reliable manner and at a low cost of manufacture.

Having now fully described my invention, what I claim and desire to secure by Letters Patent is,

In a cheese protector, the combination of the plates $a$, a hinge pin to which one of said plates is secured and to which the remaining plate is pivoted, one or more coiled springs on said hinge-pin, the opposite ends of which are respectively secured to the plates $a\ a$, and a binding strip $d'$ having one of its ends secured to one end of said pin and its remaining end adapted to be adjustably connected to the remaining end of said pin, substantially as and for the purpose specified.

DAVID M. BLACK.

In presence of—
JOEL M. DENNIS,
EDWARD O. MULLER.